May 14, 1968
N. D. BAXTER
3,383,089
MEANS FOR PREVENTING BLOW-OUTS OF PORCELAIN VALVES
Filed Dec. 19, 1966
2 Sheets-Sheet 1
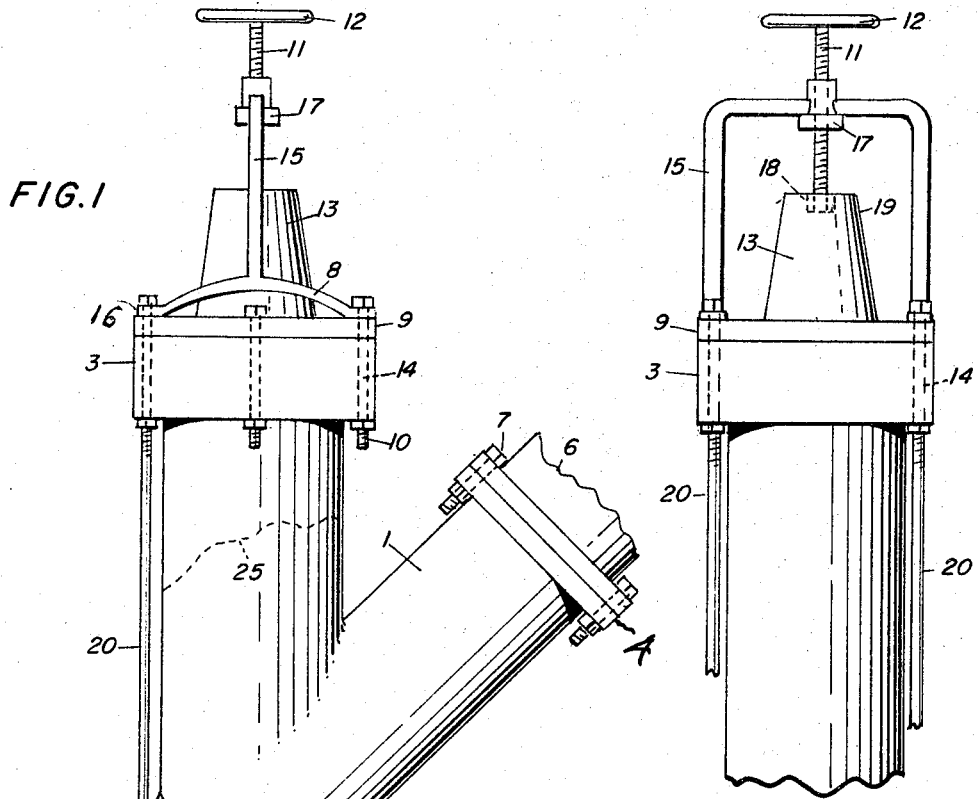
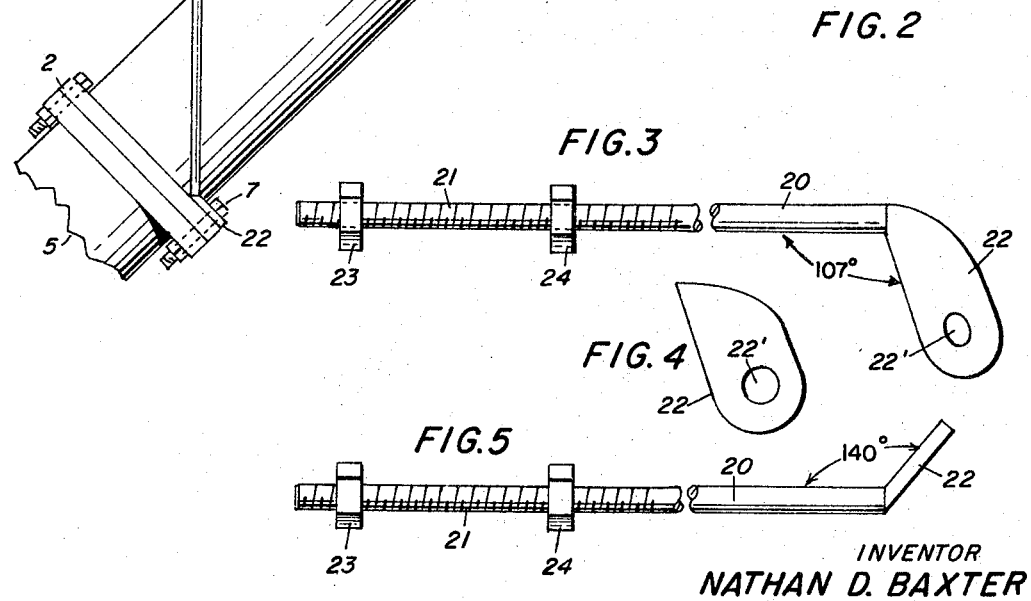
INVENTOR
NATHAN D. BAXTER
BY Beale and Jones
ATTORNEYS

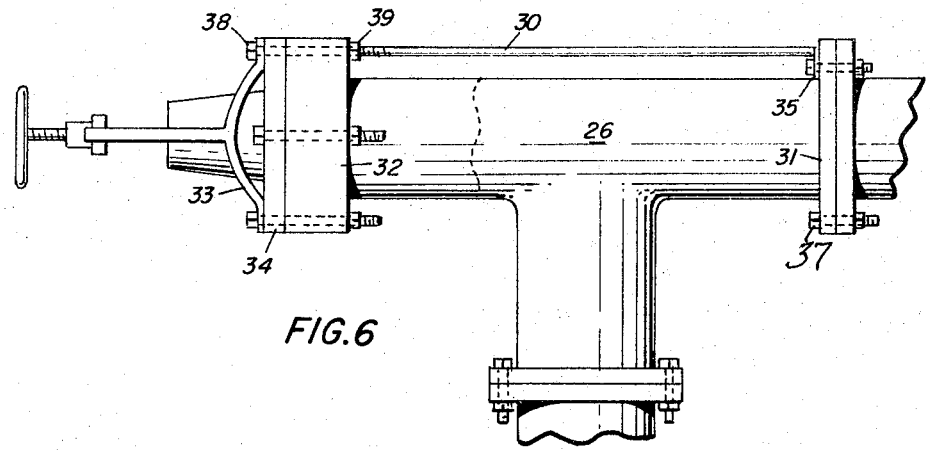
FIG.6
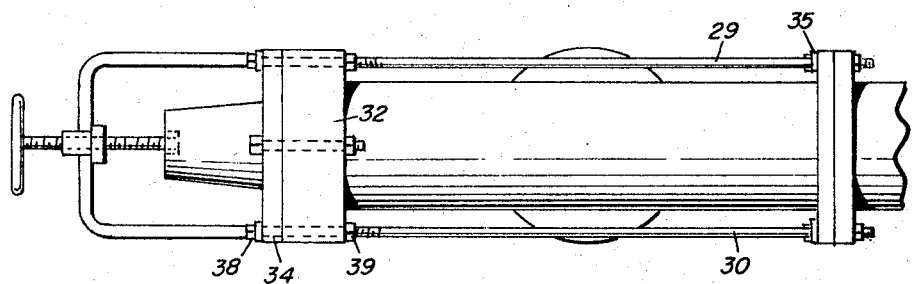
FIG.7
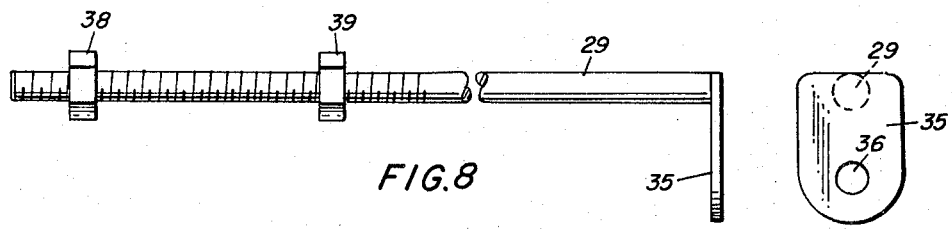
FIG.8
FIG.9
INVENTOR
NATHAN D. BAXTER
BY Beale and Jones
ATTORNEYS

United States Patent Office 3,383,089
Patented May 14, 1968

3,383,089
MEANS FOR PREVENTING BLOW-OUTS OF PORCELAIN VALVES
Nathan D. Baxter, 1404 Palm St., Henderson, Nev. 89015
Filed Dec. 19, 1966, Ser. No. 602,912
5 Claims. (Cl. 251—366)

This invention relates to means for preventing blow-outs of porcelain valves and, more specifically, to a novel application of a specific form of tie or stay rod to various forms of porcelain valves. In this art; porcelain valves are in common use in the chemical industry. Such valves include a main body having terminal flanges adapted to be secured as by bolts to sections of main chemical conveying conduits. A third or end flange is used, also, to which is attached the valve bonnet and valve operating means. According to this invention, the bolt receiving openings already formed in such flanges are used to provide an efficient and simple means to apply said specific form of rod in that such openings are made use of to secure the opposite ends of the rods to existing flanges.

Porcelain valves are commonly used in plants where corrosive fluent material is to be conveyed in conduits. Such material has a tendency to unduly corrode the valve seats and in a manner often prevent complete valve closure. If a value attendant finds it necessary to apply an excessive force to rotate the valve operator to close the valve, this force will react on the valve bonnet and, through the end flange, create a stress in the outer wall or shell of the valve and in a direction to tend to crack said wall and, possibly result in a blow-out. Such a valve blow-out of the bonnet and connected parts can endanger the attendant and, possibly cause physical injury or even death. To date, it is well known that many injuries have been caused by porcelain valve blow-outs. If the chemical fluid is conveyed under high pressure and the valve casing adjacent to the bonnet becomes cracked, the bonnet and all parts connected thereto could be forcibly blown towards the body of the attendant.

According to the present invention, novel means are employed either to lessen the tendency of a valve blow-out or to prevent material movement of any part blown off in the event that the wall of the valve actually becomes fractured.

Accordingly, a main object of the invention is to provide, in a porcelain valve, a means to prevent material movement of valve operating elements in the event of a valve blow-out.

More specifically, another object is to provide a specific form of tie rod adapted to be secured at opposite ends thereof adjacent to the outer edges of a terminal flange and an end flange and which rod is provided with adjustable means to force such flanges towards each other either to tend to prevent such a wall fracture or to prevent material movement of the valve bonnet and connected parts in the event of actual fracture.

In the drawings:
FIGURE 1 is a view, in side elevation, of a Y form of porcelain valve.
FIGURE 2 is a view, in side elevation broken away, of the valve shown by FIGURE 1.
FIGURES 3, 4 and 5 show, in detail, a preferred form of the tie rod used with FIGURES 1 and 2.
FIGURE 6 is a view, in side elevation, of a right angle form of porcelain valve.
FIGURE 7 is a top plan view of the valve shown by FIGURE 6, and
FIGURES 8 and 9 are detailed views of the tie rod used with FIGURES 6 and 7.

Referring to the drawing in detail, a Y form or valve is shown as having flanges 2, 3 and 4. The flanges 2 and 4 are adapted to be secured to similar flanges on conduit sections 5 and 6 by a series of bolts 7. A valve bonnet 8 is mounted on a plate 9 which is secured to the flange 3 by bolts 10. A threaded rod 11 which carries the handwheel 12 is rotatably mounted in the bonnet in a manner to reciprocate a valve operating plug 13 which extends into the body 1. The bolts 10 pass through openings 14 formed in the flange 3 and plate 9.

As shown by FIGURES 1 and 2, the bonnet 8 comprises a U-shaped yoke member 15 and each lower end of this member terminates in a pair of laterally extending foot members 16 the ends of which are secured to the plate 9 by means of the bolts 10. To provide an increased thread contact for the rod 11, a circular bushing or lug 17 is affixed to the yoke 15 for the rod to threadedly pass therethrough. The rod 11 has its lower end swiveled at 18 to a brass cap 19 mounted on the outer end of the plug 13 which, when reciprocated, will provide valve opening and closing.

One preferred form of novel tie-rod 20 is shown as secured to and between the flanges 2 and 3. As shown by FIGURE 3, one end of each rod 20 is threaded as at 21 while each opposite end thereof is formed flat and bent over as at 22 at a proper angle to lie flush with the free face of flange 2. The threaded end 21 is engaged within a bolt opening 14. A bolt 7 is removed from the flange 2 and this bolt is passed through a hole 22' formed in said bent end. A pair of nuts 23 and 24 is positioned on rod 20 to subject it to any desired tension to force flanges 2 and 3 towards each other. If a fracture occurs say along a line 25, the bonnet end can be forced by rods 20 and nuts 22, 23 against the main valve body in a manner to seal along the fracture line 25. If the valve body is a new one, tension in the rod 20 could well serve to prevent a fracture. FIGURES 3 and 5 show a pair of tie-rods 20 with ends 22 bent at angles of about 107 degrees and 140 degrees respectively for application to bolts 7 on opposite sides of flange 2.

FIGURES 6 and 7 show the application of tie-rods to a valve body 26 of the angle type that can be used to control fluid flow between conduit sections. Two tie-rods 29 and 30 are used to force the flanges 31 and 32 towards each other. The valve bonnet 33 is mounted on a plate 34. Each rod has a bent and flattened end 35 which is provided with a hole 36 adapted to receive a bolt 37 which engages within an opening already present in flanges 31 and 32. The free ends of rods 29 and 30 are threaded to receive nuts 38 and 39 which serve as a means to apply tension to these rods which tension serves to function in a manner as above described for tie-rod 20.

According to the prior art, it has been the practice to employ a metal of ample strength to withstand high pressures within valve casings formed from such metal, hence it has not been the practice to use any form of tie-rod or stay rod to supplement the ability of such metallic valves to resist a blow-out. However, in recent years, porcelain valves have come into common use mainly in the chemical art and only to resist valve corrosion. Such material is relatively fragile and is unable to withstand high fluid pressures. For this reason, my invention provides a novel and useful means to supplement the ability of porcelain valves to resist a blow-out and the invention is particularly adapted for application to porcelain valves already in use, or which might be used in the future.

While two forms of tie-rods have been disclosed in detail, it is to be understood that these forms might be modified in a manner to be embraced within the scope of the appended claims which are.

I claim:
1. A porcelain valve comprising a main body portion forming a fluent material passage and having a coupling end flange adapted to be connected to the end flange of a main fluid conduit, said body portion comprising a laterally extending tubular casing, a terminal flange on said casing, a valve plunger slidably mounted in said casing and terminating in an operating rod, an operating element on the free end of said rod, a support bracket secured to said terminal flange and interengaging threads on said bracket and rod whereby a force acting on said plunger to its valve closing position will be transmitted to react on said terminal flange and a tie-rod adjustably connected to and between the terminal flange and the coupling end flange and whereby the force acting on the terminal flange will, all or in part, be transferred to the coupling flange thereby to prevent excessive tension stress from acting on the wall of the tubular casing and to prevent material movement in a blow-out direction of the terminal flange and parts connected thereto in the event that the tubular casing sustains a transverse fracture.

2. In a porcelain valve as set forth in claim 1 wherein the tie-rod is provided at one end with a laterally bent and flattened portion secured by bolt means to the coupling flange the other end of the tie-rod being threaded for a distance greater than the thickness of the terminal flange and with the threaded end positioned within an opening formed through the terminal flange and a nut on said threaded end adapted to be rotated in a manner to adjustably tension said rod.

3. In a porcelain valve as set forth in claim 2 wherein the support bracket is provided with an opening, said threaded tie-rod end being positioned within said opening, the nut on the tie-rod end being operative to anchor the bracket to the terminal flange.

4. In a porcelain valve as set forth in claim 2 wherein the opening in the flattened rod end is aligned with bolt openings in the end flange coupling and in the end flange of the adjacent flange of the fluid conduit whereby the bolt normally serving to connect the last named flanges functions also to anchor said flattened rod end to said end flanges.

5. In a porcelain valve as set forth in claim 1 wherein the tubular casing extends at an angle to the body portion, and wherein there is a pair of tie-rods each having a threaded end secured to the terminal flange of the tubular casing and at opposite sides of the casing, each along a line substantially parallel to the axis of the casing, the other ends of said rods being bent and secured to the coupling end flange at points below the axis of the main body portion.

References Cited

UNITED STATES PATENTS

| | | | |
|---|---|---|---|
| 939,927 | 11/1909 | Smith | 251—366 |
| 1,404,350 | 1/1922 | Duckett | 251—366 XR |
| 1,916,738 | 7/1933 | Miller et al. | 251—366 XR |
| 1,935,329 | 11/1933 | Needham | 251—366 XR |
| 2,478,684 | 8/1949 | Brooks | 138—97 |
| 2,625,038 | 1/1953 | Jackson | 73—147 |
| 2,630,301 | 3/1953 | Lentz | 259—3 |
| 2,826,367 | 3/1958 | Cobb | 251—362 |
| 3,115,159 | 12/1963 | Yasui | 137—625.4 XR |
| 3,204,929 | 9/1965 | Bryant | 251—366 XR |

SAMUEL SCOTT, *Primary Examiner.*